J. STEPHENSON.

STREET-CAR.

No. 6,988.

Reissued March 7, 1876.

Witnesses:

D. G. Stuart

James H. Mitchell

Inventor:

John Stephenson by S. Hannay atty.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,988, dated March 7, 1876; application filed December 17, 1875.

DIVISION E[6].

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
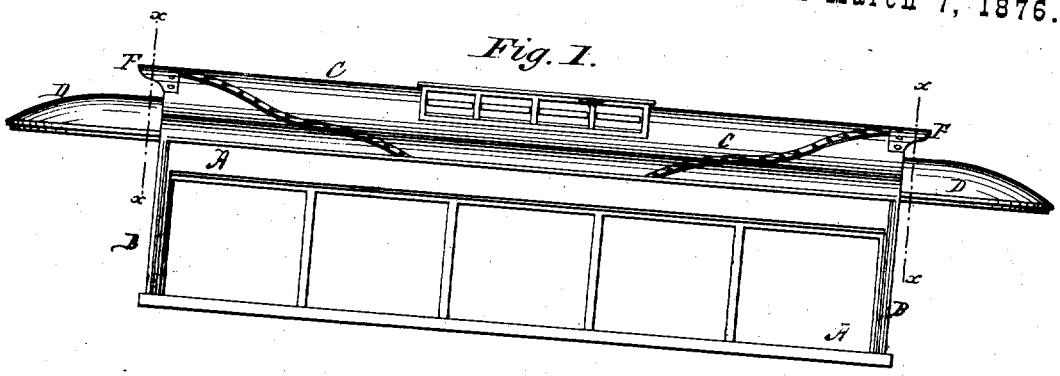
Figure 2:
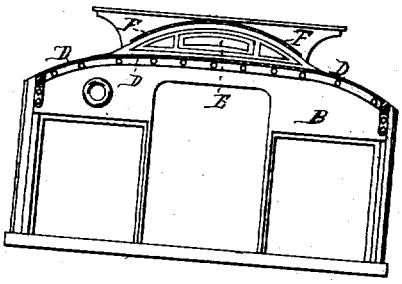
Figure 3:
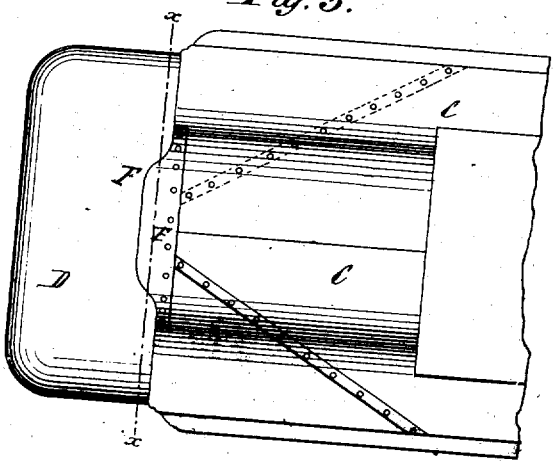
Figure 4:
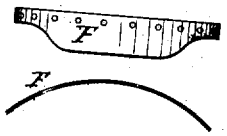

Figure 1 represents a side elevation of the upper portion of the body of a street-car to which my improvement has been applied; Fig. 2, a cross-section of the same, looking toward the body of the car. Fig. 3 represents a plan or top view of a portion of the same car, showing the relation of the roof extension to the end of the car. Fig. 4 represents a plan and edge view of the detachable frontlet.

In transporting street-cars from their place of manufacture to their final destination or place of use, whether by rail or vessel, it is very desirable to economize space. Their great length is a fruitful source of trouble in this respect.

The nearer, therefore, the total length of the car can be confined to the length of the car-body the closer will we approximate the desired result.

This subdivision of my invention has this object in view; and relates to that class of improved street-cars which are provided with a roof of the same general length as the car-body, and with a frontlet or central extension of the roof, to protect from the sun's rays and the inclemency of the weather those openings in the end of the car which are arranged for the purposes of ventilation, &c., in a plane intermediate between the central portion of the main roof and the canopy or bonnet which protects the driver's platform, and which canopy or bonnet is arranged in a plane lower than the central portion of the main roof.

The extension of the central portion of the roof for protecting the ventilating-openings in the ends of the car increases the length of the car-body, and thus increases the dimensions required for space in shipment, shop-room, &c.

My improvement to remedy the difficulty consists in limiting the main or ridge roof to the length of the car-body, and then making the frontlet or extension of the main roof an independent structure, capable of ready attachment to, or detachment from, the main roof.

To enable others skilled in the art to make, construct, and use my invention, I will now proceed to describe its parts in detail, omitting a particular description of such parts of a street-car as are unnecessary to a full understanding of the present improvement.

A indicates the body of the car; B, its ends; C, the roof, it being limited in its length to the length of the car-body. D indicates the canopy for the protection of the driver's platform, it being arranged in a plane lower than the plane of the central or arched portion of the main roof. (Shown in Figs. 1 and 2.) Between the upper side of canopy D and the central portion of the main roof, at each end of the car, is arranged an opening or openings, E, for purposes of illumination, ventilation, and signal. Above these openings, to protect them from the sun's rays, and incoming rain and snow, I apply to the ends of the car a frontlet, F, in the manner illustrated in Figs. 1, 2, and 3. This frontlet F is made in a separate piece, (shown in Fig. 4,) and is so constructed as to be readily secured to the ends of the roof by tacks or screws, or to be detached therefrom, as occasion may require and the circumstances of the case dictate. As a rule, I prefer to make it of sheet metal, cut of suitable size and form for the purpose.

Having described my invention, what I claim as new, and desire to secure by Letters Patent, is—

1. A detachable frontlet, F, for the protection of an opening in the end of a car from the sun or inclemency of the weather, substantially as set forth.

2. The combination of a detachable frontlet, F, with the roof of a car-body, constructed in the manner substantially as and for the purpose set forth.

In testimony that I claim the foregoing I have hereunto set my hand this 3d day of December, 1875.

JOHN STEPHENSON.

Witnesses:
S. A. STEPHENSON,
AUGUST RIPPERGER.